March 13, 1951     J. R. WNUK     2,545,127
LUNCH RECEPTACLE
Filed Feb. 4, 1949
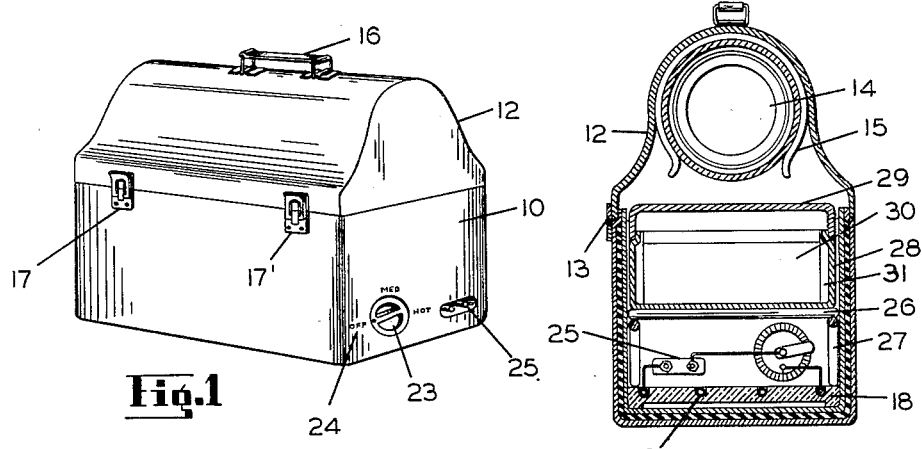
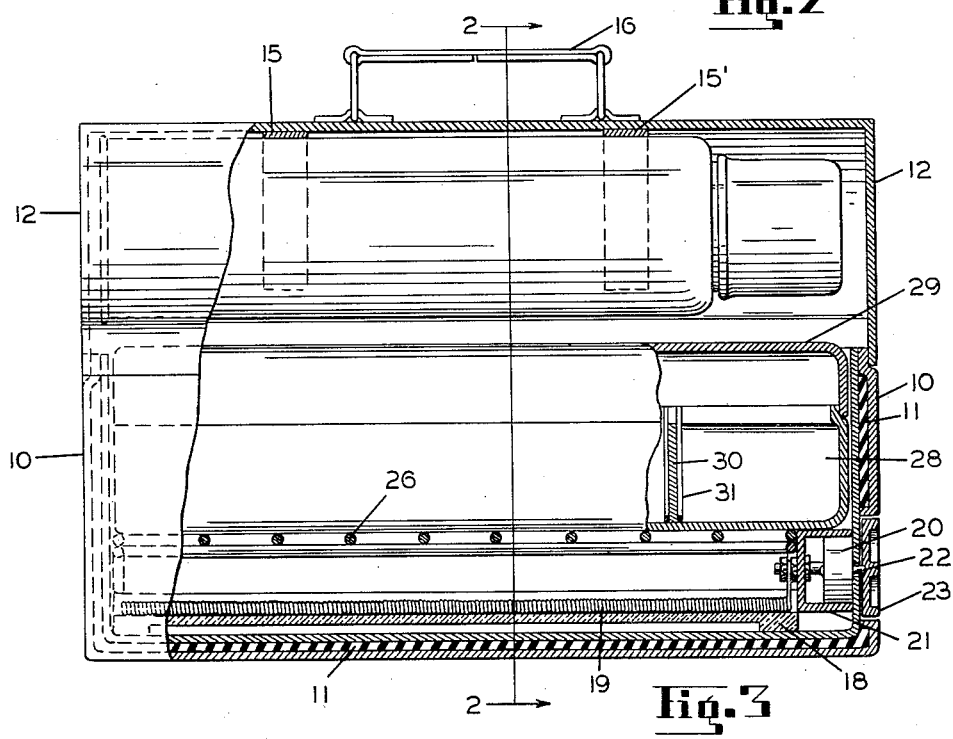
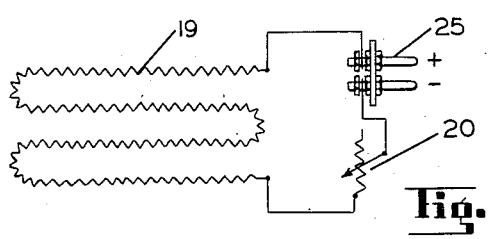
*INVENTOR.*
JOSEPH R. WNUK
BY Christian L. Nielsen
ATTORNEY.

Patented Mar. 13, 1951

2,545,127

UNITED STATES PATENT OFFICE 2,545,127

LUNCH RECEPTACLE

Joseph R. Wnuk, South Milwaukee, Wis.

Application February 4, 1949, Serial No. 74,625

3 Claims. (Cl. 219—19)

My invention relates to improvements in lunch receptacles and more particularly to a lunch receptacle that is provided with an electrically energized heating element.

An object of my invention is to provide a device that is equipped with a grill disposed over the heating element for the preparation or heating of food.

Another object of my invention is to provide a device that is equipped with a sectional covered container for food to be heated over the grill.

A further object of my invention is to provide a device forming an enclosure, constructed in a manner to permit carrying a liquid in combination with the grill and food container.

A still further object of my invention is to provide a device that has a manually operated control, recessed within one end thereof to permit the regulation of the temperature of the heating element.

Still another object of my invention is to provide a device that is compact in design, easy to construct, serviceable for the purpose intended, and having no projecting parts that might interfere when transporting.

The device described lends itself readily for use as a lunch kit and incorporates the features of a controlled electrically energized heating element and enables the user to plug the device into any convenient current receptacle to heat a portion of the food, thereby eliminating the necessity of consuming cold food, which oft times is not only undesirable but detrimental.

Other and further objects of my invention will become more apparent as the description proceeds and when taken in conjunction with the drawings in which Figure 1 is a perspective view of the outside of the container showing the contact plug receptacle and recessed current control knob at the end of the container.

Figure 2 is a fragmentary lateral cross-sectional view of the device taken at line 2—2 in Figure 3.

Figure 3 is a fragmentary longitudinal cross-sectional view of the device showing the arrangement of the various component parts constituting the device, and Figure 4 is a diagrammatic sketch of the wiring diagram.

Similar characters of reference indicate corresponding parts throughout the several views, and referring now to the same, the character 10 shows the body of the device which is constructed of a double wall and has insulation shown at 11 inserted between the double portions of wall. There is a cover shown at 12 which is hingedly attached at 13 to the insulated body 10. The cover 12 has a radial contour to accommodate a liquid receptacle 14 which is supported by means of two resilient clamp members 15 and 15', and the top of the cover 12 is provided with a handle 16 for the convenience of the user in conveying the device.

The cover 12 obviously is retained in contact with the body 10 by means of the engaging members 17 and 17' which may be of any conventional design. The bottom of the body portion 10 is provided with a refractory plate 18 into which a heating element 19 is disposed, and the heating element 19 is connected with a rheostat 20 disposed within a receptacle 21 forming a part of the inner wall of the body portion 10. The rheostat 20 has a projecting shaft 22 onto which a knob 23 is attached. The face of the knob 23 is shown flush with the outer surface of the insulated body 10.

It will also be noticed in Figure 1 a legend 24 may be embossed or applied to the outer surface of the body 10 at its end so that the regulation and control of the rheostat 20 may be noted by the user when revolving the knob 23.

There are a pair of contact points shown as 25 recessed within the end wall of the insulated body 10 to permit engagement of a conventional plug attached to a cord, not shown, which cord is again inserted into a conventional receptacle forming the source of electric current for the operation of the heating element 19.

Above the refractory plate 18 I show a grill constructed of a plurality of cross members 26 and standards 27 which support the cross members 26 above the grill portion 18, and a partitioned container 28 is shown disposed on top of the grill members 26. This container 28 is provided with a cover 29 and a plurality of partitions 30 arranged in any convenient manner. The partitions 30 may be removable and inserted within channels 31 disposed on the outer wall of the container 28 so that the partitions 30 may be moved and arranged to fit the particular purpose for which the container 28 is used.

It is manifest to anyone familiar with the art that the type of container shown will lend itself to carrying of lunch. Liquid may be contained in the liquid container 14 in the cover 12 while sandwiches or the like may be disposed within the container 28 above the grill 26, or it may be desirable to have the compartments within the container 28 filled with other food that can be warmed for consumption by the user.

The container 28 may be removed and the grill may be exposed for any purpose of heating liquid or the like, the device being a self-contained unit that can be easily conveyed by the user and is adaptable for heating the food contained therein.

While I have shown a specific construction and a particular arrangement of the component parts constituting the device, I am fully cognizant of the fact that many changes in the form and configuration of these component parts may be made without effecting their operativeness, and I reserve the right to make such changes as I may deem necessary or convenient without departing from the spirit of my invention or the scope of the appended claims.

Having thus described my invention, what I claim and desire to secure by Letters Patent in the United States is:

1. A device of the character described comprising in combination a receptacle, a cover for said receptacle, the bottom and side walls of said receptacle being insulated, means within said cover for supporting a liquid container, said receptacle provided with an electrically energized heating element, a rheostat disposed within one of the walls of said receptacle, said rheostat provided with a revolving control member, a pair of contact points disposed within the walls of said receptacle, a flat, horizontal grill disposed within said receptacle at a point above said heating element, a removable partitioned container disposed above said grill, said container provided with a separate cover.

2. A device of the character described comprising an insulated receptacle open at its upper end, a cover hingedly supported by said receptacle, an electrically energized heating element disposed at the bottom of said receptacle, a flat horizontally disposed grill disposed within said receptacle at a point above said heating element, a portable covered container for engagement within said receptacle at a position above said grill, said container provided with a plurality of partitions, clamping means within the cover of said receptacle to support a liquid container, current contact means within the walls of said receptacle for engagement with a current conveying means and control means disposed within the walls of said receptacle for regulating the current leading to said heating element.

3. A device of the character described comprising in combination an insulated rectangular receptacle open at its upper end, a cover hingedly supported by said receptacle, a liquid container disposed within the cover of said receptacle, an electrically energized heating element disposed at the bottom of said receptacle, a flat horizontally disposed grill supported by said receptacle at a point above said heating element, a container provided with a cover disposed on said grill, said container provided with a plurality of removable partitions, contact means within the walls of said receptacle for engagement with a current conveying means, and control means disposed within the walls of said receptacle for regulating the amount of current leading to said heating element, said control means and contact means arranged in a manner whereby their outer surface is even with the outer surface of the insulated receptacle.

JOSEPH R. WNUK.

REFERENCES CITED

The following references are of record in the file of this patent:

UNITED STATES PATENTS

| Number | Name | Date |
|---|---|---|
| 1,412,761 | Tingstrom | Apr. 11, 1922 |
| 1,979,222 | Goodwin | Oct. 30, 1934 |
| 2,187,196 | Douglass | Jan. 16, 1940 |
| 2,274,285 | Walker | Feb. 24, 1942 |
| 2,295,221 | King | Sept. 8, 1942 |